Figure 1:
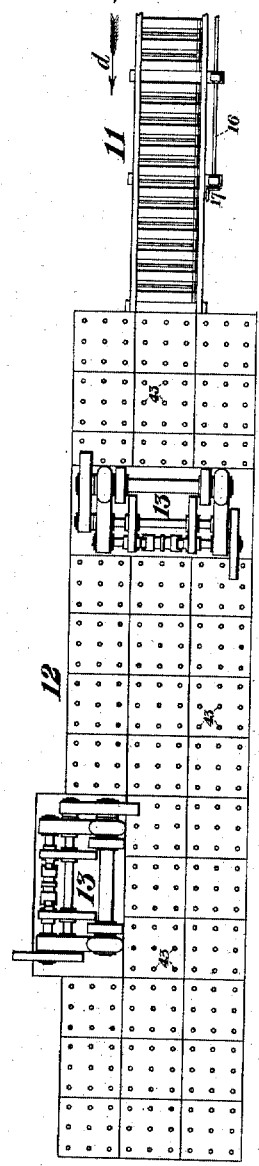

(No Model.)  4 Sheets—Sheet 1.

H. AIKEN.
TABLE FOR CONVEYING AND COOLING METAL PLATES.

No. 450,360.  Patented Apr. 14, 1891.

WITNESSES

INVENTOR
Henry Aiken (No Model.) 4 Sheets—Sheet 3.
H. AIKEN.
TABLE FOR CONVEYING AND COOLING METAL PLATES.

No. 450,360. Patented Apr. 14, 1891.

*Fig. 3.*

WITNESSES
W. B. Corwin
Thomas W. Bakewell

INVENTOR
Henry Aiken (No Model.) 4 Sheets—Sheet 4.

H. AIKEN.
TABLE FOR CONVEYING AND COOLING METAL PLATES.

No. 450,360. Patented Apr. 14, 1891.

UNITED STATES PATENT OFFICE.

HENRY AIKEN, OF PITTSBURG, PENNSYLVANIA.

TABLE FOR CONVEYING AND COOLING METAL PLATES.

SPECIFICATION forming part of Letters Patent No. 450,360, dated April 14, 1891.

Application filed November 7, 1890. Serial No. 370,601. (No model.)

*To all whom it may concern:*

Be it known that I, HENRY AIKEN, of Pittsburg, in the county of Allegheny and State of Pennsylvania, have invented a new and useful Improvement in Tables for Conveying and Cooling Plates, of which the following is a full, clear, and exact description.

The object of my invention is to provide means for conveying plates from the rolls to the shears at which their edges are trimmed, and for cooling them in their transit in such manner as to prevent them from warping and becoming distorted in shape, as they do when placed on the mill-floor and allowed to cool there.

The apparatus illustrated in the accompanying drawings and hereinafter described comprises two conveying-tables provided with driven rollers and extending substantially parallel to each other in opposite directions, one table leading from the rolls and the other table leading to the shears, with transfer mechanism adapted to transfer the plates from the one table to the other. The plates are moved along these tables and by the transfer mechanism, preferably step by step, so that they cool gradually with both surfaces exposed to the air, and are delivered at the shears in condition to be trimmed.

My present invention relates to an improvement which consists in the combination of two feed-tables, however constructed and whether provided with driven rollers or not, and adapted to carry the rolled plates, in combination with transfer mechanism for conveying the plates from one table to the other, the advantage of which arrangement is that it economizes space in the mill and is otherwise of great convenience. The tables may extend parallel with each other and may be adapted to act in opposite directions, as shown; or they may be otherwise arranged, so as to be adapted to the shape of the building in which they are used.

It also consists in plate-carrying mechanism composed of traveling supports—such as chains—adapted to carry the sheets and to expose both sides thereof to the air.

The invention also consists in certain details of construction hereinafter particularly indicated.

I shall now describe my improvement so that others skilled in the art may make and use the same, reference being had to the accompanying drawings, forming part of this specification, in which—

Figure 2:
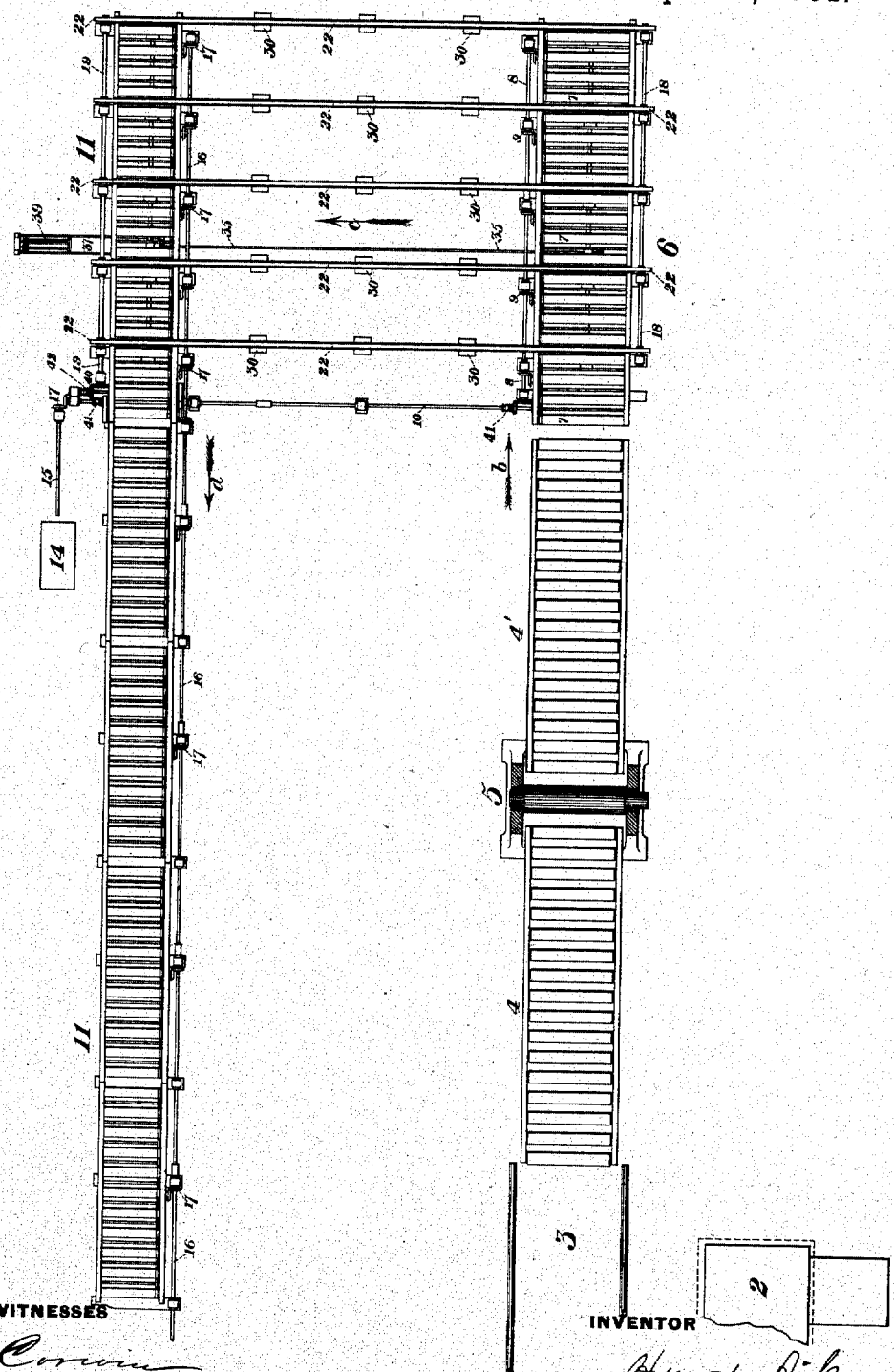
Figure 4:
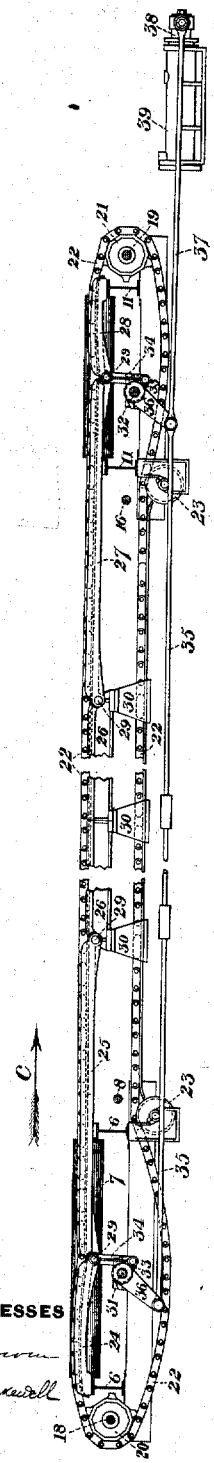
Figure 5:
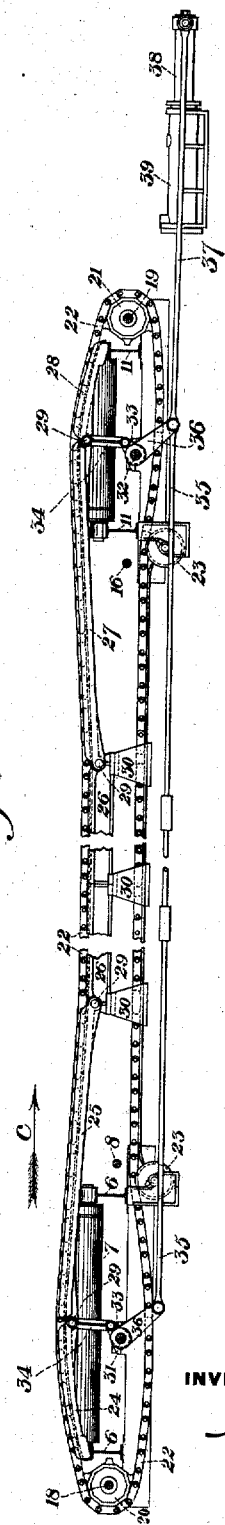

Figures 1 and 2 show in plan view a mill plant having my improved apparatus. These figures show portions of the same view, they having been put on separate sheets in order to prevent the crowding of the parts which would result from combining them in a single figure. Fig. 3 is a plan view showing the transferring mechanism on a larger scale. Fig. 4 is a sectional side elevation, the section being on the line IV IV of Fig. 3; and Fig. 5 is a similar view showing the parts in a different position.

Like symbols of reference indicate like parts in each.

In the drawings, 2 2 represent a series of furnaces for heating metal blooms preparatory to rolling them into plates.

3 is a track extending in front of the furnaces, on which track travels a car or crane for conveying the heated metal to the feed-tables of rolls 5, by which the metal is reduced to the form of plates. These tables 4 4' consist of a series of driven feed-rollers situate at both sides of the rolls 5 and adapted to be operated in the usual manner to convey the metal to and to remove it from the rolls.

The means which I employ for conveying the rolled-metal plates to the shears, by which their edges are trimmed, are shown in detail on Figs. 3, 4, 5 of the drawings. At the end of the table 4', and leading therefrom, is an auxiliary table 6, composed of a series of parallel driven rollers 7, journaled in suitable bearings in the side rails of the table and driven by a shaft 8 and gearing 9 from a driven shaft 10.

11 is a second table constructed similarly to the table 6 and arranged parallel therewith, extending in the opposite direction to the table or floor 12, Fig. 1, on which the shears 13 are situate. The rollers of this table are driven by a suitable power-engine 14 through shafts 15 and 16 and gearing 17, and the shaft 10 may also be mechanically connected with the same engine, as shown.

The mechanism for transferring the plates laterally from the table 6 to the table 11 is shown in Figs. 3, 4, and 5. 18 and 19 are shafts journaled in suitable bearings at the outer sides of the tables 6 and 11 and provided with sprocket-wheels 20 and 21, connected by endless conveying-chains 22. The lower branches of these chains are supported by wheels 23, Figs. 4 and 5, and the other branches, except when engaged in transferring the metal from the table 6 to the table 11, should be below the surface of the tables, so that they shall not interfere with the passage of the metal on the latter. The means used for lifting the chains above the level of the rollers and lowering them below the surface of the same consist, preferably, of guide-bars made of sections 24, 25, 26, 27, and 28 of channel-iron jointed together at points 29. The outer ends of the sections 24 and 28 rest freely on the outer side rails of the tables 6 and 11, so as to be capable of sliding thereon. The middle section 26 between the tables need not be capable of vertical motion and may be fixed to supports 30. To lift the guide-bars I employ cross-shafts 31 and 32, journaled beneath the tables 6 and 11 and connected by levers 33 and links 34 with the bars 24 25 and 27 28, respectively. The shafts are connected by a rod 35 and lever-arms 36, and one of the arms 36 is connected by rods 37 with the reciprocatory plunger 38 of a cylinder 39, so that by moving this plunger longitudinally the arms 36 may be oscillated and the shafts 31 32 turned correspondingly. Turning these shafts produces an oscillation of the levers 33, and by the links 34 will elevate or lower the guide-bar sections accordingly as the plunger is projected or retracted.

In Fig. 5 I show the guide-bars elevated by projection of the plunger and the chains lifted thereby above the level of the feed-rollers of the tables 6 and 11, while in Fig. 4 these parts are shown lowered below the level of the tables. The sprocket-wheel shaft 19 is driven by gearing 40, and the feed-roller driving-gear and the sprocket-shaft driving-gear are provided, respectively, with clutches 41 and 42, by which they may be disconnected from or connected with the engine, and thus stopped or started at will.

The operation of the apparatus is as follows: The metal bloom or ingot, having been taken from one of the furnaces, is deposited on the feed-table of the rolls, and after being rolled thereby into plate form is conveyed by the rollers of the table 4' and delivered upon the table 6, whose rollers rotate in the direction of the arrow $b$, and then by reversing the driving-engine the plate may be carried back and forth by rotation of the feed-rollers until it stiffens, the effect of which will be to straighten any warped or buckled part of the plate. Then to transfer the plate from the table 6 to the table 11 the sprocket-chains are elevated above the level of the tables in the manner above described, and by rotating the shaft 19 the chains may be moved so as to carry the plate in the direction of the arrow $c$ toward the table 11. When the plate arrives at said table, the chains are lowered to deposit the plate on the feed-rollers thereof, and then by driving said rollers the plate is moved in the direction of the arrow $d$ toward the shears. As the plates arrive at the shears they are removed from the table 11 and are sheared in the usual way. For convenience in manipulating the plates, the shear-floor is preferably provided with inverted casters set in sockets 43, as described and claimed in my Letters Patent, No. 393,051, dated November 20, 1888. In practice, instead of conveying the plates continuously from the feed-table of the rolls to the shears, I prefer to move them gradually, advancing them step by step by intermittent motions of the conveying mechanism, so that a whole series of the plates may be resting on said mechanism at once. The advantage of this is that time is given to the plates to cool before they are sheared, and during said cooling they are supported in such manner that the air has access to both sides.

It will be understood by those skilled in the art that many changes in the form and arrangement of the parts of the apparatus may be made without departing from the scope of my invention, as stated in the following claims. Thus it is possible to construct the tables 6 and 11 not of driven rollers, but otherwise. For example, they may be composed of rails or inverted casters and provided with devices for moving the plates over their surfaces. The use of the conveying-chains is advantageous for many reasons in conveying and cooling the plates, and I intend to claim the same specially herein.

I claim—

1. As means for conveying and cooling metal plates, the combination, with rolls adapted to roll metal plates, and the rolling-mill feed-table, of conveying-tables, one of which is situate adjacently to and is independent of the feed-table and is adapted to receive the metal plates therefrom, and transfer mechanism adapted to transfer the plate from the first table to the next, substantially as and for the purposes described.

2. As means for conveying and cooling metal plates, the combination, with rolls adapted to roll metal plates, and the rolling-mill feed-table, of conveying-tables composed of series of rollers, one of which is situated adjacently to and is independent of the feed-table and is adapted to receive the metal plates therefrom, and transfer mechanism adapted to transfer the plate from the first table to the next, substantially as and for the purposes described.

3. As means for conveying and cooling metal plates, the combination, with the plate-rolls and the shears, of an interposed traveling support, which bears on a part only of the surface of the plate, whereby access of air thereto is afforded, substantially as and for the purposes described.

4. As means for conveying and cooling metal plates, the combination, with the plate-rolls and the shears, of an interposed endless chain, which bears on a part only of the surface of the plate, whereby access of air thereto is afforded, substantially as and for the purposes described.

5. As means for conveying and cooling metal plates, the combination of conveying-tables comprising series of rollers and driven chains extending between the tables, adapted to transfer the metal from one to the other, substantially as and for the purposes described.

6. As means for conveying and cooling metal plates, the combination of conveying-tables comprising series of rollers, driven chains extending between the tables and adapted to transfer the metal from one to the other, and mechanism for raising said chains above the level of the tables, substantially as and for the purposes described.

7. As means for conveying and cooling metal plates, the combination of conveying-tables comprising series of rollers, driven chains extending between the tables and adapted to transfer the metal from one to the other, vertically-movable guides on which the chains move, levers connected with said guides and adapted to lift them, and a motor for actuating said levers, substantially as and for the purposes described.

8. As means for conveying and cooling metal plates, the combination of conveying-tables comprising series of rollers, driven chains extending between the tables and adapted to transfer the metal from one to the other, and gearing by which the rollers of the tables and the chains may be driven independently, substantially as and for the purposes described.

In testimony whereof I have hereunto set my hand this 30th day of October, A. D 1890.

HENRY AIKEN.

Witnesses:
W. B. CORWIN,
THOMAS W. BAKEWELL.